Sept. 29, 1925.
R. C. MUNDY
SIDE CRANKING DEVICE
Filed March 6, 1924
1,555,597
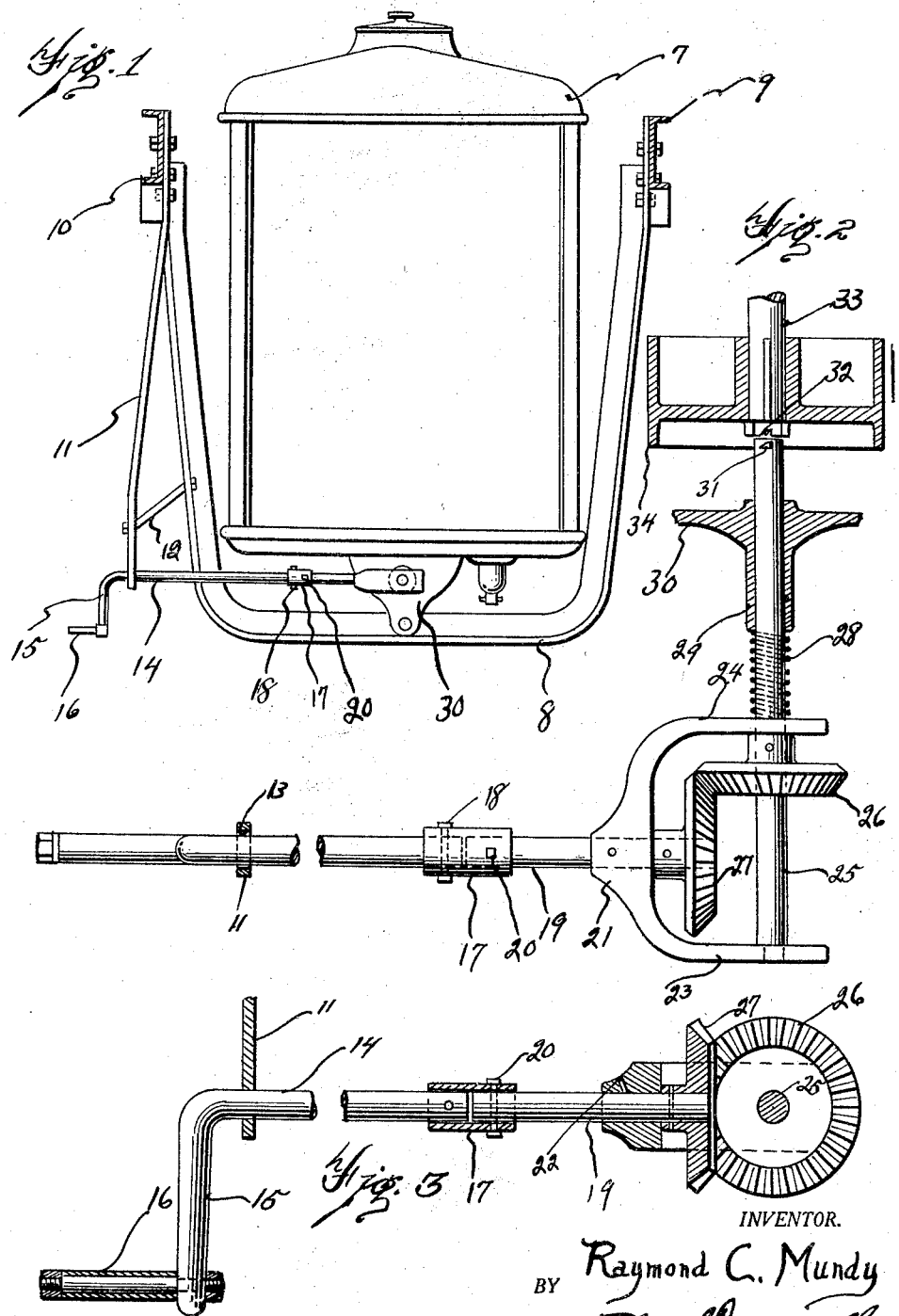
INVENTOR.
BY Raymond C. Mundy
ATTORNEY Patented Sept. 29, 1925.

1,555,597

UNITED STATES PATENT OFFICE.

RAYMOND C. MUNDY, OF FLINT, MICHIGAN, ASSIGNOR OF ONE-HALF TO LEE PARKER, OF SWARTZ CREEK, MICHIGAN.

SIDE CRANKING DEVICE.

Application filed March 6, 1924. Serial No. 697,208.

*To all whom it may concern:*

Be it known that I, RAYMOND C. MUNDY, a citizen of the United States, residing at Flint, in the county of Genesee and State of Michigan, have invented a new and useful Improvement in a Side Cranking Device, of which the following is a specification.

My invention relates to a new and useful improvement in a side cranking device adapted for cranking an internal combustion engine for starting the same from the side of the vehicle and is particularly adapted for use in connection with trucks, tractors, and the like, upon which is mounted a super-structure projecting forwardly of the vehicle so as to render it necessary in order to crank the engine from the front part thereof to operate from beneath the forwardly extending super-structure.

An object of the invention is the provision of a side cranking device of the class mentioned which will be simple in structure, economical of manufacture and highly efficient in use.

Another object of the invention is the provision of a side cranking device of this class having a plurality of co-operating gears and so arranged as to permit the movement of the cranking device into operative and inoperative position at the will of the operator.

Another object of the invention is the provision of a side cranking device of the class described, having an operating part so constructed and arranged as to permit the movement by the operating part of the working parts into operative and inoperative position upon a slight movement of the operating part.

Other objects will appear hereinafter.

The invention consists in the combinations and arrangements of parts hereinafter described and claimed.

The invention will be best understood from a reference to the accompanying drawings which form a part of this specification and in which, Fig. 1 is a front elevational view showing the invention mounted on a vehicle, Fig. 2 is a top plan view showing parts in section, Fig. 3 is a side elevational view with parts in section.

As shown in the drawings, the invention is adapted for use in connection with a vehicle having an internal combustion engine for propelling the same and provided with a radiator 7 around which extends a substantially U-shaped supporting member 8, suitably fastened to beams 9 and 10, which are adapted to project forwardly of the vehicle for mounting the superstructure thereon. It is apparent that the particular method of mounting the U-member 8 on the frame of the vehicle may be altered and changed according to the uses to which the vehicle is to be put. Secured to the beam 10, at one side of the radiator 7, is a downwardly projecting offset supporting member 11, suitably braced to the U-shaped member 8 by a brace 12 and provided, adjacent its lower end, with an opening 13 in which is positioned an operating rod 14, the opening 13 allowing sufficient clearance to permit a slight horizontal movement of the rod 14 in the opening. The rod 14 is provided with an angularly turned portion 15 in which is mounted a suitable handle 16 to provide a crank for turning the rod 14. A sleeve 17 is adapted to receive the end of the member 14, a bolt 18 being projected through the member 14 and through the sleeve. The inside diameter of the sleeve 17 is slightly larger than the diameter of the rod 14 so as to permit a slight play of the rod 14 in the sleeve 17. Mounted in the other end of the sleeve 17 by a suitable bolt 20 projected therethrough is a shaft or rod 19, the bolt 20 being projected transversely of the bolt 18, so as to afford the functions, to some slight degree, of a universal joint, the diameter of the shaft 19 being less than the inside diameter of the sleeve 17. The shaft 19 is loosely journalled in a suitable opening formed in the neck 21 of a bracket, a suitable oil passage 22 being directed to the bearing. The legs 23 and 24 of the bracket are positioned upon a shaft 25 so as to permit the shaft 25 to rotate therein. Fixedly mounted upon the shaft 25 is a bevelled gear 26 adapted to mesh with a bevelled gear 27 fixedly mounted upon the shaft 19. It is thus seen that a turning of the crank through the operating handle 16 will effect a turning of the shaft 25. A spiral spring 28 is mounted, in embracing relation, upon the shaft 25 between the leg 24 and a forwardly projecting neck 29, which is made integral with the radiator bracing portion 30. Projecting from the end of the shaft 25 are studs 31 which are adapted to engage in notches 32 formed in the forward end of the crank shaft 33 upon which is mounted the fan drive pulley 34.

In operation a turning of the rod 14 will effect a turning of the shaft 25 and in order to turn the crank shaft 33 for cranking the engine, it is necessary that the projections 31 be brought into engagement with the notches 32. In order to effect this, the rod 14, at its angularly turned portion 15, is thrust forward so as to bring a rearward pressure at the sleeve 17. This will force the bracket together with the gears and the shaft 25 rearwardly of the vehicle against the tension of the spring 28 so as to bring the projections 31 into engagement with the notches 32. When this engagement is had, a rotating of the rod 14 will serve to crank the engine and while the rotation is being performed, the engagement of the projections 31 with the notches 32 will prevent a withdrawal of these parts from engagement with each other. As shown in Fig. 2, the notches 31 are provided with a bevelled surface over which the beveled surface of the notches 32 would ride when the engine is started by cranking. The spring 28 will then restore the bracket and its assembled parts to normal position, thus permitting the running of the engine without effecting a turning of the gears 26 and 27.

While I have illustrated and described the preferred form of structure, I do not wish to limit myself to the precise form of structure shown but desire to avail myself of such variations and modifications as come within the scope of the appended claims.

Having thus described my invention what I claim as new and desire to secure by Letters Patent is:

1. A side cranking device of the class described comprising a shaft adapted for axial alignment with the crank shaft of an engine with which used; a gear mounted on said axially aligned shaft; a bracket comprising a pair of legs, each of said legs being adapted for the reception of said shaft; an additional shaft projected through the base of said bracket; a gear mounted on said additional shaft adapted for meshing with said first mentioned gear; a spiral spring mounted on said axially aligned shaft for maintaining said axially aligned shaft normally in dis-engagement from said crank shaft; a sleeve mounted on said additional shaft, said additional shaft having play in said sleeve; an operating handle mounted in said sleeve and adapted for having play therein; and a supporting member for supporting said operating handle, said operating handle being adapted for slight movement relatively to said supporting member.

2. A side cranking device of the class described comprising a supporting member; a shaft projected through an opening formed in said supporting member, said opening permitting horizontal play of said shaft therein; a sleeve mounted on said shaft, adjacent one end thereof, said sleeve being of larger diameter than said shaft; an extension shaft mounted in said sleeve, said sleeve being of larger inside diameter than said shaft; a bracket for supporting said extension shaft; a pair of legs mounted on said bracket; a gear mounted on said extension shaft between said legs; a shaft axially aligned with the crank shaft of an engine with which used and extending transversely of the said extension shaft; a gear mounted on said axially aligned shaft between the legs of said bracket and adapted for meshing with said first mentioned gear; and resilient means mounted on said axially aligned shaft for normally maintaining the same in disengagement from said crank shaft.

In testimony whereof I have signed the foregoing specification.

RAYMOND C. MUNDY.